Nov. 3, 1964 V. S. THOMANDER 3,155,904
REPULSION IRON VANE ASSEMBLY
Filed Jan. 16, 1961 2 Sheets-Sheet 1
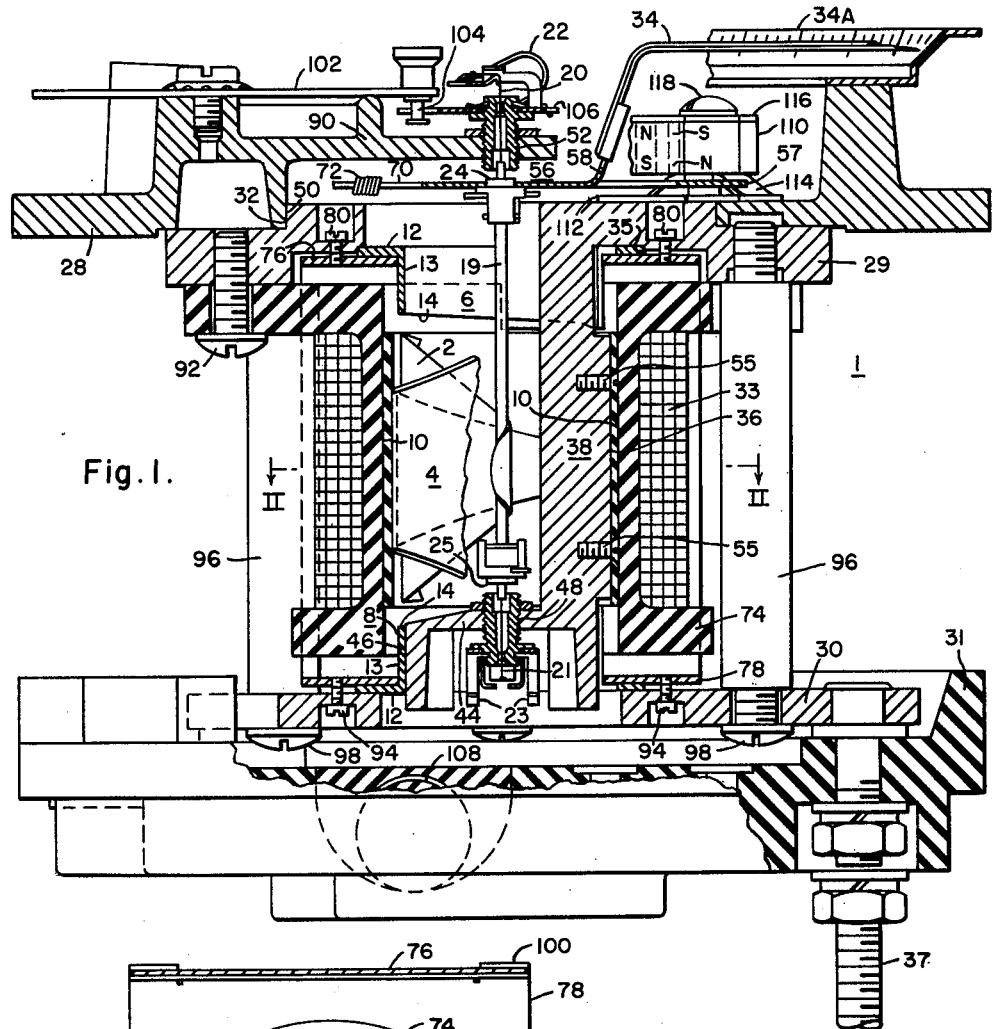
Fig. 1.
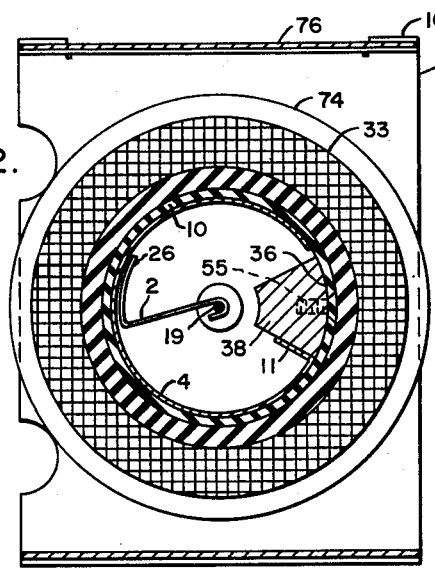
Fig. 2.
Fig. 9.
INVENTOR
Veron S. Thomander.
BY
John L. Houghton
ATTORNEY Nov. 3, 1964 V. S. THOMANDER 3,155,904
REPULSION IRON VANE ASSEMBLY
Filed Jan. 16, 1961 2 Sheets-Sheet 2
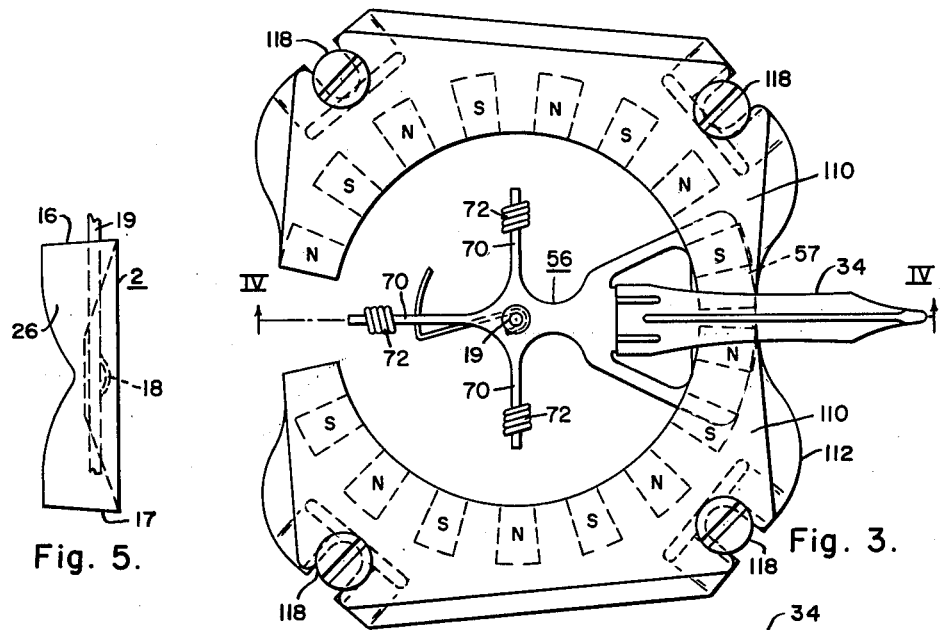
Fig. 5.
Fig. 3.
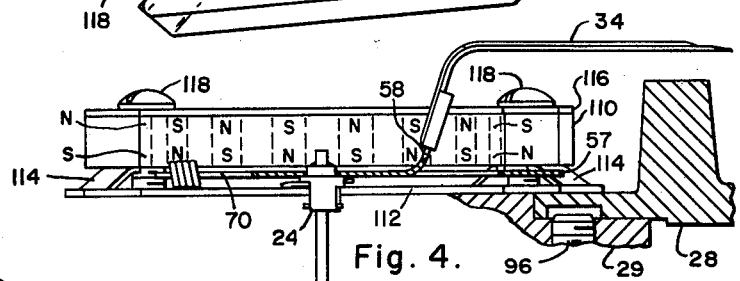
Fig. 4.
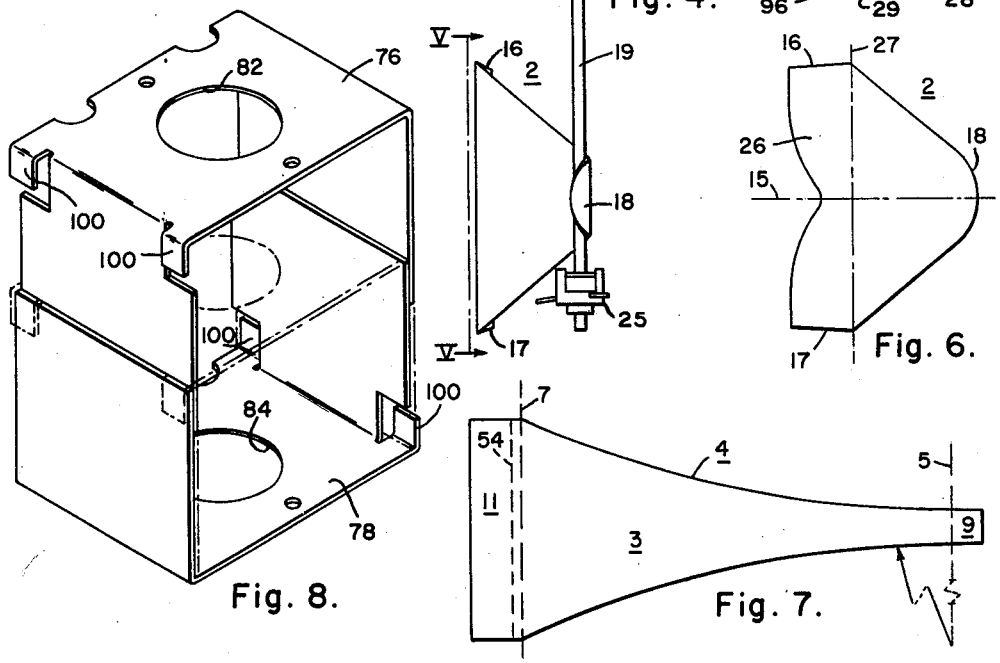
Fig. 8.
Fig. 7.
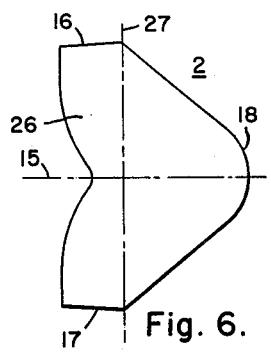
Fig. 6.

3,155,904
REPULSION IRON VANE ASSEMBLY
Veron S. Thomander, Maplewood, N.J., assignor to Westinghouse Electric Corporation, East Pittsburgh, Pa., a corporation of Pennsylvania
Filed Jan. 16, 1961, Ser. No. 82,828
9 Claims. (Cl. 324—147)

This invention relates generally to measuring instruments and more specifically to instruments for measuring electrical quantities.

A primary object of this invention is to provide an electrical instrument having improved operating characteristics.

Another object is to provide such an instrument which is highly sensitive and requires a minimum energy signal.

Another object is to provide such an instrument in which the moving elements thereof are of low mass and low inertia to provide a minimum time response interval.

Another object is to provide such an instrument which has a scale approaching uniform distribution.

Another object is to provide such an instrument which has a minimum number of parts, which is economical of manufacture, and requires a minimum of service.

A still further object is to provide such an instrument which can easily be duplicated so that it may be made in quantities.

A still further object is to provide an improved damping construction.

A still further object is to provide such an instrument which is extremely rugged and can endure high shocks.

Further objects will be apparent from the specification, the appended claims, and the drawings, in which:

FIGURE 1 is a view substantially in central section showing an instrument embodying the invention;

FIG. 2 is a view taken substantially along the line II—II of FIG. 1 and looking in the direction of the arrows;

FIG. 3 is a partial top plan view of a portion of the instrument illustrating the damping mechanism without the front keeper member;

FIG. 4 is a view taken substantially along the line IV—IV of FIG. 3 and looking in the direction of the arrows but including the front keeper member;

FIG. 5 is a view taken substantially along the line V—V of FIG. 4 and looking in the direction of the arrows;

FIG. 6 is a developed view of the movable vane showing its shape before forming;

FIG. 7 is a developed view showing the repulsion vane;

FIG. 8 is an exploded view of the magnetic flux return element and stray flux shield; and, FIG. 9 is a detailed view of one of the attraction vanes.

Referring to the drawings by characters of reference, the numeral 1 designates generally an electrical instrument of the repulsion iron vane type having a movable iron vane 2 which may comprise an elongated sheet material member. The vane 2 is mounted for rotation relative to a repulsion vane 4 which may comprise a sheet material member. Front and rear attraction vanes 6 and 8 are additionally provided. The repulsion vane 4 is cemented or otherwise secured to the inner surface of a hollow circularly cylindrical member 10 and as is shown developed in FIG. 7 comprises a generally wedge-shape with a center section 3 formed intermediate the dot-dash lines 5 and 7. The edge portions are arcuate sections of constant radius having their center of curvatures located on the line 5. The end sections 9 and 11 preferably are rectangular. A vane so constructed with its arcuate sections of a constant curvature may be easily duplicated and tools for forming the same are considerably less expensive than if the changing curvature sections as taught by the prior art were used.

The attraction vanes 6 and 8 are substantially mirror copies of each other. Within the generic scope of the invention, they may of course be fabricated in any desired manner and may be formed of more than one piece of magnetic material. In its more specific form, the attraction vanes are of one piece construction and turned from bar stock of non-permanent magnetic material. Each of the vanes 6 and 8 comprises a flat annular ring portion 12 and a sleeve or tubular portion 13 terminating in an end surface 14 which forms a portion of a helix. It will be appreciated that this form of end surface may be easily made in a thread cutting lathe and is easily duplicated.

The movable vane 2 as illustrated in FIG. 6 is somewhat heart or V-shaped and is symmetrical about the dot-dash line 15. The cross-sectional area of the vane 2 at the line 15 is substantially twice that at the forward and rear edge portions 16 and 17. The convex nose portion 18 adjacent the line 15 is formed to at least partially surround a shaft 19 which is pivotally supported on front and rear taut suspension bands 20 and 21 which are resiliently held at their outer end portions by tension springs 22 and 23. The inner ends of the bands 20 and 21 are secured to towers 24 and 25 suitably secured to adjacent end portions of the shaft 19. The shaft support is shown and described in detail in my copending application, Serial No. 761,899, filed September 18, 1958, now Patent No. 3,111,623, dated November 19, 1963, for "Instrument Mechanisms" and assigned to the same assignee as is this application.

The other or outer edge portion 26 of the vane is bent substantially along the dot-dash line 27 and the portion 26 is further given an arcuate formation about the shaft 19 as its center of curvature as may best be seen in FIGS. 2 and 3 to provide an armature portion. The edge portions 16 and 17 converge slightly so that, with the portion 26 shaped as illustrated in FIG. 3, they are substantially parallel with the adjacent one of the end surfaces 14.

The instrument 1 further comprises a first or front frame member 28, a second or rear frame member 29, a sub-base member 30, and a base support 31. The members 28, 29 and 30 are fabricated of non-magnetic material and may conveniently be die-cast. The base support 31 may be of molded plastic and carries a pair of terminals 37 (only one of which is visible in FIG. 1) to which a flux producing coil 33 is connected. It will be understood that the instrument 1 as illustrated in FIG. 1 may be positioned within a hollow cylindrical casing (not illustrated). In such event the base support may form the rear end wall of the casing. The front end wall may be closed by a transparent member, of any usual form, through which the indicator arm 34 and the calibrated dial plate 34A may be viewed.

The rear frame member 29 is provided with a first surface having a circular peripheral face or shoulder 32 which may be used as the base surface for chucking of the member 29 for machining of the locating surfaces for the attraction vanes 6 and 8 and the member or sleeve 10 which supports the repulsion vane 4. With the face 32 chucked, a circular recess or shoulder 35 is machined for receiving the ring portion 12 of the front attraction vane 6. The recess 35 is of slightly less depth than the thickness of the portion 12 so that the portion 12 may be clamped as described below to hold the attraction vane 6 in adjusted position. With the member 29 still chucked, the arcuate surface 36 is machined on the outer face of the outer surface of the rearwardly extending supporting lug 38. The rearwardly extending supporting lug or post portion 38 is shaped generally in the form of a sector of a circle with a portion of the pointed section cut away to provide space for the moving element shaft 19 which is supported coaxially with said circular face 32 in a manner to be described below. The rear frame member 29 is further provided with a circularly cylindrical bracket 44 at the rearward end of the supporting lug 38. With the frame member 29 still chucked, the outer surface 46 of the bracket 44 is machined to be circularly cylindrical and coaxial with the circular face 32. The rear attraction vane 8 fits over the cylindrical surface 46 which serves to locate radially, the rear attraction vane 8. The bracket 44 is further provided with a threaded aperture 48 coaxially arranged with the face 46 and in which the rear suspension mounting is screw threaded. Since all of the surfaces 35, 36 and 46 and aperture 48 are machined at one chucking of the rear frame member 29 they are accurately coaxial to the same centerline.

The front frame member 28 is provided with an inwardly facing circular surface 50 and a screw threaded aperture 52 coaxial with the surface 50. When the members 28 and 29, so fabricated, are assembled by telescoping the surfaces 32 and 50, the aperture 52 will be coaxial with the aperture 48.

The repulsion vane 4 is cemented or otherwise secured to the circular inner cylindrical surface of the member 10 which may comprise a section of a suitable non-magnetic phenolic tubing. The section 11 of the vane 4 is bent substantially along the dotted line 54 so that it extends substantially radially of the member 10 and against the adjacent radial surface of the post 38. The vane 4 extends around the inner wall of the tubing with the section 9 terminating adjacent the opposite radial surface of the post 38 as best shown in FIG. 2. The cylindrical member 10 is securely held to the surface 36 which forms the segment of a circular cylinder having its axis of curvature coaxial with the shaft 19 as by means of screws 55. The member 10 is thereby held coaxial with shaft 19.

An assembly 56 is carried by the front tower 25 and comprises an apertured fan-shaped portion with an arcuate rim part forming a damping vane 57. The fan-shaped portion is also provided with an upstruck finger 58 to which the pointer 34 is secured to the finger 58 in any convenient manner as by rebent side arms so that the pointer 34 may be slid over the finger 58. The assembly further includes a substantially T-shaped portion having outwardly extending arms 70 which carry balance weights 72. The three weights 72 are individually carried on the portions 70 and may be slid therealong in order to balance the moving element.

The movable elements associated with the shaft 19 and the front and rear frame members 28 and 29 may be completely assembled apart from the remaining stationary elements such as the vanes 2, 4 and 6, the spool 74 and the U-shaped flux return and shield members 76 and 78. With this arrangement the assembler has easy access to the parts to facilitate the assembling of the parts and such assembling may be accomplished with the parts in clear view which always is an advantage for obvious reasons. The taut bands 20 and 21 are assembled to the tension springs 22 and 23 in the manner taught in the said copending application Serial No. 761,899.

The front attraction vane 6 is provided with an aperture 79 which permits the vane 6 to be telescoped over the post or lug 38 into its position against the shoulder 35 and is frictionally held thereagainst by the base section of member 76 which in turn is secured to the adjacent surface of the rear frame member 29 as by means of the screws 80. In this regard, it will be noted that the bases of the members 76 and 78 are each provided with apertures 82 and 84 through which the sleeves 13 extend. The size of the aperture 82 is sufficiently large to permit it to slip over the post 38 and into position against the frame member 29 without any additional aperture similar to aperture 79 of vane 6.

The vane 6 is also provided with a plurality of apertures 86 in its ring portion 12. It will be noted that there is a relatively greater space 88 between the center two of the apertures 86 than between either outer two thereof. The apertures 86 are so located that with the vane 6 in its tentative position the space 88 will be rearwardly of the tongue 90 of the front frame member 28. The vane 6 may be rotated one way or the other to bring the instrument into calibration by the insertion of a tool into one of the apertures 86 and fulcruming the tool on the tongue 90.

The hollow circularly cylindrical member or tube 10 with the repulsion vane 4 cemented to its inner peripheral surface is assembled over the post 38 and secured thereto by the screws 55. Thereafter the spool 74 is slipped over the tube 10 and secured to the rear surface of the rear frame member 29 by a plurality 92 of screws (only one of which is illustrated) which extend loosely through the front spool flange and are screw threaded to the frame member 29. In this way the spool 74 and the coil or winding 33 thereon are located coaxially of the shaft 19.

The rear attraction vane 8 is inserted into the base aperture 84 of the shield member 78 and this member is secured to the sub-base member 30 as by the screws 94 which frictionally clamp the flange or annular portion 12 of the vane 8 between the member 78 and base 30. This sub-assembly is then assembled into the relative position shown in FIG. 1 with the sleeve or tubular portion 13 of the vane 8 telescopically located on the accurately machined outer cylindrical surface 46; the screws 94 holding vane 8 against accidental movement but being sufficiently loose to permit the vane 8 to move into coaxial alignment with the shaft 19. A plurality of posts 96 are screw threadedly secured to the rear frame member 29 and extend rearwardly therefrom and are of a sufficient length to engage the forward face of the sub-base member 30 which is secured thereagainst as by means of the screws 98 which extend loosely through apertures in the member 30 and are threaded into the posts 96.

The shield members 76 and 78 are U-shaped and are identical with each other. Each thereof has the aforementioned apertured base members and two substantially parallelly extending sides. One of the sides of each member 76 and 78 adjacent its base is ruptured to provide a pair of spaced tangs 100. When the members 76 and 78 are telescoped into place the extending end portion of the side not having the tang will seat against the tangs 100 of the other of the members 78 and 76. With this arrangement the adjacent side faces of the sides of the members 76 and 78 will be held in good face-to-face contact so that a low reluctance continuous flux path is provided.

When the coil 33 is energized the flux is caused to flow longitudinally between the attraction vanes 6 and 8 through the repulsion vane 4 and the movable vane 2. The flux so flowing returns through the low reluctance path provided by the flux return members 76 and 78 which seat against the two attraction vanes 6 and 8. Due to the low reluctance of the members 76 and 78 any stray flux in the vicinity of the instrument 1 will be shunted around the vanes 2, 4, 6 and 8 and will not influence the operation of the instrument 1.

The zero setting of the instrument 1 is adjusted by the pivoted arm 102 which carries a pin 104 received in the bifurcated portion of a pivoted arm 106 which supports the front band 20. Rotation of the arm 106 supplies the necessary twist to the band 20 to determine the deenergized rotative position of the shaft 19 and consequently the zero position of the pointer 34 with respect to the indicia on the dial plate 34A. The multiplying resistor 108 is imbedded in the base support 31 as shown.

The damping vane 57 extends radially outward from the shaft 19 (see FIGS. 1 and 5) and into an air gap intermediate a pair of side-by-side damping magnet portions 110 and a flux return or keeper member 112. Each damping magnet portion 110 may comprise a block of ceramic-ferrite material having the general formula $MO_6Fe_2O_3$ wherein M represents barium, strontium, or lead. The material $BaO_6Fe_2O_3$ is commercially available and is satisfactory. Such a magnet may have a coercive force in excess of 1500 oersteds and has excellent resistance to corrosion. Furthermore, this material may be molded in block shape without salient poles and yet may be magnetized to provide a number of poles as shown (FIG. 3) which are conveniently close enough together so that a plural number thereof are adjacent the vane 57 at all times.

The keeper member 112 seats against the front surface of the front frame member 28. The magnet portions 110 overlie the keeper member 112 and seat against suitable spacers in the form of outstruck fingers 114 of the keeper member 112. A front keeper member 116 of similar size and shape to the member 112 may be used and if used seat against the front face of the magnet portions 110. The two keeper members 112 and 116 and magnet portions 110 are held in place by screws 118. If the magnet portions 110 are of the order of ¼ inch in thickness the upper keeper member 116 need not be used and the magnet need not be energized to a strength necessary to provide poles extending completely therethrough and in such event the front portions of the magnet will act to conduct flux between the front end of the established magnetic poles. If still less damping is desired, the rear keeper 112 may be omitted.

It will be apparent that the construction taught by applicant lends itself to great simplicity of construction and the utilization of inexpensive tools in its manufacture without in any way sacrificing accuracy in the instrument. The vanes 2 and 4 are preferably fabricated from a low reluctance iron such as the iron now being sold under the trademark Hipernik. If such iron is used the grain structure should be arranged to run longitudinally of the axis of the shaft 19. Such iron, especially for the vane 2 is desirable because greater flux will flow therethrough for the same degree of magnetomotive force established by the coil 33 with a given thickness of iron.

It is highly desirable that the weight of and inertia of the vane 2 be maintained as low as practical, low reluctance iron is therefore desirable to reduce the weight. With the illustrated shape of vane 2 the inertia is also reduced to a practical low minimum quantity. It will be noted that the center portions of the vane 2 adjacent the line 15 is approximately twice the cross-sectional area as the area at the surfaces 16 and 17. This is desirable to maintain the same flux density in the vane since the center portions will have more flux because of the leakage flux pattern. It will be further noted that while the center portion is of greater cross-sectional area for the purpose set forth above it is also located inwardly toward the axis of rotation of the vane 2 since the inertia varies as the second power of the radius. This is highly important even though it may slightly increase the flux path length.

It will further be noted that the edges 16 and 17 of the vane 2 are straight lines in their developed form as illustrated in FIG. 6 and of a taper such that the vane 2 is formed as illustrated in FIGS. 3 and 5, the edge portions or surfaces 16 and 17 are substantially parallel to the end surface 14 to which they are adjacent. This parallel relationship will be constant, of course, at all relative rotative positions of the vanes 2, 6 and 8. As stated above, the repulsion vane 4 is of a particular construction comprising an initial portion in which the opposite side edges are parallel to each other and of constant axial dimension, an intermediate portion in which the opposite side edges are of constant concave curvature, and a final portion in which the opposite side edges are parallel to each other and of constant axial dimension. The initial portion is in part located radially of the shaft 19 and of the substantially same axial length as the axial length of the armature portion of the vane 2. When energized the vanes 2 and 4 have like poles adjacent each other which due to their repelling action cause the vane 2 to rotate clockwise (FIG. 3) until the magnetic forces are equal and opposite to the torque exerted by the bands 20 and 21.

The presence of the radial portion of vane 4 assures the correct initial rotation of the vane 2 which is especially true when one or both of the attraction vanes 6 or 8 are adjusted into their clockwise rotated positions in which the surfaces 14 may exert a substantial attractive force tending to cause vane 2 to rotate counterclockwise. The length of the initial portion which extends peripherally of the tube or member 10 helps to amplify the initial movement of the vane 2 to make it more sensitive to changes in energization of the coil 33. As the energization of the coil 33 increases the repulsion force must be decreased at a relative fast rate, as represented by the rapidly decreasing axial length of the vane 4, if the increase in the angle of rotation of the vane 2 is to remain substantially proportional to the increase in energization of the coil 33. This relationship, it will be appreciated, is desirable to provide an instrument which is equally useful throughout its operating range. As the vane 2 continues to rotate clockwise the adjacent length of vane 4 must decrease in axial length at a lesser rate to maintain the desired relationship between angle of rotation and energization of the coil until near the up-scale end of the instrument the axial length of the repulsion vane 4 remains constant and the continued rotation of the vane 2 is due to the increase in magnitude of the repulsion forces between the vanes 2 and 4 and of the attraction forces between the vane 2 and vanes 6 and 8. It should be noted that the attraction distance between the vane 2 and vanes 6 and 8 progressively decrease at a constant rate and the attractive forces therebetween progressively increase. This increase in the attractive forces of course cooperates with the repulsion forces to provide a relatively constant angular movement for equal increases in energization of the coil 33 to provide a substantially constant scale distribution.

While the invention contemplates other size combinations, it has been found that a vane 4 of thickness of .010 inch and having a section 11 with an axial length of 1.050 inches and a longitudinal length of .250 inch of which approximately .188 inch of which extended radially, a section 3 which has a longitudinal length of 2.062 inches and a section 9 having a longitudinal length of .130 inch is satisfactory. The axial length of the section 9 is .160 inch and the radius of the arcuate edges of section 3 is 5 inches taken along the dot-dash line 5. The attraction vanes may each have a ring portion 12 of 1.116 inches in diameter with a sleeve 13 having an internal diameter of .761 inch with a wall thickness of .026 inch. The helical angle of the surface 14 may be that of a six thread per inch lead.

While a preferred form of the invention has been shown and described in accordance with the patent statutes, it is to be understood that numerous modifications are possible and it is desired to cover all modifications falling within the scope of the invention.

What is claimed and is desired to be secured by United States Letters Patent is as follows:

1. In an electrical instrument, a first frame member having an aperture extending completely therethrough, said member having a first circular shoulder surrounding said aperture, a second frame member having first and second surfaces, said first surface being provided with a second circular shoulder of substantially the same diameter as said first shoulder, said second frame member having a post portion extending outwardly from said second surface, said post having a circularly cylindrical portion spaced from said second surface, said cylindrical portion having an aperture coaxial with the center of curvature thereof, said post portion being located entirely to one side of a first axis extending through the center of curvatures of said second circular shoulder and of said cylindrical portion, said post further being provided with a surface portion which forms a segment of a circular cylinder having its axis of curvature lying along said first axis, said frame members being positioned with said circular shoulders seated together, said first frame member having a portion overlying its said aperture, said overlying portion having an aperture coaxial with said axis, a hollow circular tubular member surrounding a part of said post portion and having an inner surface, the radius of said inner surface of said tubular member being equal to the radius of said post surface portion, means securing said tubular member to said post surface portion, a repulsion vane secured to and extending peripherally of said inner surface, a shaft having its longitudinal axis extending along said first axis, means supporting said shaft for rotation and carried in said aperture in said overlying portion and in said aperture in said post cylindrical portion, and a movable vane carried by said shaft and having a portion extending outwardly therefrom, said extending portion of said movable vane having an end portion spaced from said repulsion vane and cooperable therewith to cause movement of said shaft.

2. In an electrical instrument, a first frame member having an aperture extending completely therethrough, said member having a first circular shoulder surrounding said aperture, a second frame member having first and second surfaces, said first surface being provided with a second circular shoulder of substantially the same diameter as said first shoulder, said second frame member having a post portion extending outwardly from said second surface, said post having a circularly cylindrical portion spaced from said second surface, said cylindrical portion having an aperture coaxial with the center of curvature thereof, said post portion being located entirely to one side of a first axis extending through the center of curvatures of said second circular shoulder and of said cylindrical portion, said post further being provided with a surface portion which forms a segment of a circular cylinder having its axis of curvature lying along said first axis, said frame members being positioned with said circular shoulders seated together, said first frame member having a portion overlying its said aperture, said overlying portion having an aperture coaxial with said axis, a hollow circular tubular member surrounding a part of said post portion and having an inner surface, the radius of said inner surface of said tubular member being equal to the radius of said post surface portion, means securing said tubular member to said post surface portion, a repulsion vane secured to and extending peripherally of said inner surface, a shaft having its longitudinal axis extending along said first axis, means supporting said shaft for rotation and carried in said aperture in said overlying portion and in said aperture in said post cylindrical portion, a movable vane carried by said shaft and having a portion extending outwardly therefrom, said extending portion of said movable vane having an end portion spaced from said repulsion vane and cooperable therewith to cause movement of said shaft, and a first and a second attraction vane, each said attraction vane including a circular cylindrical sleeve portion and a ring like flange portion, said sleeve portion varying in longitudinal length in a peripheral direction, said first frame member having a shoulder coaxial with said first shoulder, said flange portion of said first attraction vane seating in said last named shoulder with said sleeve portion of said first attraction vane extending toward said movable vane having its said sleeve surrounding said circularly cylindrical portion of said post portion and held thereby with its said sleeve extending toward said movable vane coaxially with said first axis.

3. In an electrical instrument, a first frame member having a first circular shoulder, a second frame member having first and second surfaces, said first surface being provided with a second circular shoulder of substantially the same diameter as said first shoulder, said second frame member having a post portion extending outwardly from said second surface, said post having a circularly cylindrical portion spaced from said second surface, said cylindrical portion having an aperture coaxial with the center of curvature thereof, said post portion being located entirely to one side of a first axis extending through the center of curvatures of said second circular shoulder and of said cylindrical portion, said post further being provided with a surface portion which forms a segment of a circular cylinder having its axis of curvature lying along said first axis, said frame members being positioned with said circular shoulders seated together, said first frame member having a portion overlying said first circular shoulder, said overlying portion having, and coaxial with said axis, a hollow circular tubular member surrounding a part of said post portion and having an inner surface, the radius of said inner surface of said tubular member being equal to the radius of said post surface portion, means securing said tubular member to said post surface portion, a repulsion vane secured to and extending peripherally of said inner surface, a shaft having its longitudinal axis extending along said first axis, means supporting said shaft for rotation and carried in said aperture in said overlying portion and in said aperture in said post cylindrical portion, a movable vane carried by said shaft and having a portion extending outwardly therefrom, said extending portion of said movable vane having an end portion spaced from said repulsion vane and cooperable therewith to cause movement of said shaft, a first and a second attraction vane, each said attraction vane including a circular cylindrical sleeve portion and a ring like flange portion, said sleeve portion varying in longitudinal length in a peripheral direction, said first frame member having a shoulder coaxial with said first shoulder, said flange portion of said first attraction vane seating in said last named shoulder with said sleeve portion of said first attraction vane extending toward said movable vane coaxially of said first axis, said second attraction vane having its said sleeve surrounding said circularly cylindrical portion of said post portion and held thereby with its said sleeve extending toward said movable vane coaxially with said first axis, and a pair of U-shaped magnetic members, each said magnetic member having a pair of substantially parallelly extending side portions and a transversely extending base portion, each said base portion having an aperture therethrough, a first of said magnetic members having its base portions seating against said flange portion of said first attraction vane on the side thereof facing said movable vane with said sleeve portion of said first attraction vane extending through its said aperture, a second of said magnetic members having its base portion seating against said flange portion of said second attraction vane on the side thereby facing said movable vane with said sleeve portion of said second attraction vane extending through its said aperture, said side portion of said first magnetic member extending toward said base portion of said second magnetic member, said side portion of said second magnetic member extending toward said base portion of said first magnetic member, said side portions of said first magnetic members being in individual face to face contact with said side portion of said second magnetic member to form a continuous magnetic path between said attraction vane.

4. In an electrical instrument, a supporting structure, a shaft, means carried by said structure and supporting said shaft for limited rotation about its longitudinal axis, said structure having a portion extending generally axially of said shaft and having a curved surface portion forming a portion of a circular cylinder with its center of curvature coaxial with said shaft axis, a circularly tubular member having an inner curved surface having the same curvature as said curved surface portion of said structure, a first vane, said first vane comprising an elongated sheet member of magnetic material, said elongated member being formed to conform to a major portion of said curved inner surface with its longitudinal dimension extending peripherally of said curved inner surface, said sheet material member being of varying dimension in a direction transverse to its said longitudinal dimension, a movable vane carried by said shaft, said movable vane comprising a sheet member of magnetic material having a portion secured to said shaft and a supporting portion extending radially outwardly of said shaft and an armature portion forming a portion of the surface of a circular cylinder having its center of curvature coaxially with said shaft axis, said supporting portion of said movable vane comprising a tapered section of increasing width in a direction outwardly of said shaft, said armature portion comprising a section having tapered axially spaced edge portions to provide a decreasing axial length of said armature portion in a direction away from said supporting portion of said movable vane, and coil means for establishing flux-flow in said vanes in a direction longitudinally of said tubular member as a function of the degree of energization of said coil means.

5. In an electrical instrument, a supporting structure, a shaft, means carried by said structure and supporting said shaft for limited rotation about its longitudinal axis, said structure having a portion extending generally axially of said shaft and having a curved surface portion forming a portion of a circular cylinder with its center of curvature coaxial with said shaft axis, a circularly tubular member having an inner curved surface having the same curvature as said curved surface portion of said structure, a first vane, said first vane comprising an elongated sheet member of magnetic material, said elongated member being formed to conform to a major portion of said curved inner surface with its longitudinal dimension extending peripherally of said curved inner surface, said sheet material member being of progressively decreasing dimension, a movable vane carried by said shaft, said movable vane comprising a sheet member of magnetic material having a portion secured to said shaft and a supporting portion extending radially outwardly of said shaft and an armature portion forming a portion of the surface of a circular cylinder having its center of curvature coaxially with said shaft axis, said supporting portion of said movable vane comprising a tapered section of increasing width in a direction outwardly of said shaft, said armature portion comprising a section having tapered axially spaced edge portions to provide a decreasing axial length of said armature portion in a peripheral direction away from said supporting portion of said movable vane, said armature portion having an outer edge portion connecting its said spaced edge portions, said outer edge portion curving toward said supporting portion from each of said spaced edge portions to provide a central reduced width portion of said armature portion, and coil means for establishing flux flow in said vanes in a direction longitudinally of said tubular member as a function of the degree of energization of said coil means.

6. In combination, a supporting structure having a post, said post having an outer surface forming a portion of a first circular cylinder, a shaft having a longitudinal axis, means rotatably supporting said shaft on said structure with said longitudinal axis lying along the longitudinal axis of said cylinder, a movable magnetic material vane comprising an armature portion and a supporting portion, said supporting portion being carried by said shaft and positioning said armature portion for rotation in a path which forms a portion of a circular cylinder concentrically arranged with said first cylinder, a hollow circularly cylindrical member, a stationary vane, said stationary vane comprising an elongated piece of magnetic sheet material having edge portions defining a strip of progressively decreasing width, means securing said strip to the inner surface of said hollow member with said strip extending peripherally around said inner surface, the length of said strip which is secured to said hollow member being less than the length of the circumference of said inner surface by a dimension not less than the circumferential dimension of said outer surface of said post to provide a surface portion of said hollow member for engagement with said outer surface of said post, means securing said surface portion of said hollow member to said outer surface of said post, a coil spool, a coil wound on said spool, said spool having a circularly cylindrical cavity telescopically receiving said hollow member and positioned thereby so that said coil establishes flux flow in said vanes in a direction longitudinally of said hollow cylindrical member as a function of the degree of energization of said coil.

7. In combination a supporting structure, a shaft having a longitudinal axis, means rotatably supporting said shaft on said structure, a movable magnetic material vane comprising an armature portion and a supporting portion, said supporting portion being carried by said shaft and positioning said armature portion for rotation in a path which forms a portion of a circular cylinder, a hollow cylindrical member, a stationary vane, said stationary vane comprising an elongated piece of magnetic sheet material having edge portions defining a strip of progressively decreasing width, means securing said strip to the inner surface of said hollow member with said strip extending peripherally around said inner surface, each said edge portions being of constant curvature about a center point which lies along a line extending normal to a longitudinal bisecting axis of said strip and located adjacent the point of minimum width of said strip, said armature portion comprising a sheet material section having an outer edge portion spaced from said supporting portion and extending generally longitudinally of said hollow cylindrical member, said outer edge portion curving toward said supporting portions from each of said spaced edge portions to provide a central reduced width portion of said sheet material section, said supporting portions being of sheet material and being of progressively increasing dimension in a direction longitudinally of said hollow tubular member when taken in a direction from said shaft to said armature portion, and coil means for establishing flux flow in said vanes in a direction longitudinally of said hollow cylindrical member as a function of the degree of energization of said coil means.

8. A vane for an electrical instrument comprising a sheet piece of magnetic material which is symmetrical about an axis of symmetry, said piece comprising a first portion and an armature portion and a supporting portion connecting said first and armature portions and supporting said armature portion in spaced relation to said first portion, said supporting portion being of progressively increasing width from a portion adjacent said first portion toward said armature portion, said armature portion being formed into arcuate shape about an axis of curvature, said axis of curvature extending normal to said axis of symmetry, said armature portion having an outer edge portion extending generally parallel to said axis of curvature, said outer edge portion curving toward said supporting portion to provide a central reduced width portion of said armature portion.

9. In an electrical instrument, a first frame member having an aperture extending completely therethrough, said member having a first circular shoulder surrounding said aperture, a second frame member having first and second surfaces, said first surface being provided with a second circular shoulder of substantially the same diameter as said first shoulder, said second frame member having a post portion extending outwardly from said second surface, said post having a circularly cylindrical portion spaced from said second surface, said cylindrical portion having an aperture coaxial with the center of curvature thereof, said post portion being located entirely to one side of a first axis extending through the center of curvatures of said second circular shoulder and of said cylindrical portion, said post further being provided with a surface portion which forms a segment of a circular cylinder having its axis of curvature lying along said first axis, said frame members being positioned with said circular shoulders seated together, said first frame member having a portion overlying its said aperture, said overlying portion having an aperture coaxial with said axis, a coil, locating means including a hollow circular tubular member for positioning said coil, said tubular member surrounding a part of said post portion and having an inner surface, the radius of said inner surface of said tubular member being substantially equal to the radius of said post surface portion, means securing said tubular member to said post surface portion whereby said coil is located relative to said first axis, a shaft having its longitudinal axis extending along said first axis, means supporting said shaft for rotation and carried in said aperture in said overlying portion and in said aperture in said post cylindrical portion, and a movable magnetic material vane carried by said shaft and having a portion extending outwardly therefrom, a second magnetic material vane, means supporting said second vane on said frame member, said extending portion of said movable vane having a portion spaced from said second vane and cooperable therewith to cause movement of said shaft.

References Cited in the file of this patent

UNITED STATES PATENTS

| | | |
|---|---|---|
| 665,798 | Olivetti | Jan. 8, 1901 |
| 2,260,026 | Hoare | Oct. 21, 1941 |
| 2,610,989 | Wiese | Sept. 16, 1952 |
| 2,933,686 | Lenehan | Apr. 19, 1960 |
| 3,026,477 | Guptill | Mar. 20, 1962 |

FOREIGN PATENTS

| | | |
|---|---|---|
| 288,665 | France | May 9, 1899 |
| 230,601 | Australia | Sept. 24, 1959 |